US007259752B1

(12) United States Patent
Simmons

(10) Patent No.: US 7,259,752 B1
(45) Date of Patent: Aug. 21, 2007

(54) METHOD AND SYSTEM FOR EDITING ELECTRONIC INK

(75) Inventor: Alex J. Simmons, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 589 days.

(21) Appl. No.: 10/186,847

(22) Filed: Jun. 28, 2002

(51) Int. Cl.
*G06F 3/041* (2006.01)

(52) U.S. Cl. ................. 345/173; 382/187; 382/188; 715/500

(58) Field of Classification Search ............. 345/173; 382/187–188; 715/500–524
See application file for complete search history.

(56) References Cited

U.S. PATENT DOCUMENTS

| | | | | |
|---|---|---|---|---|
| 2,354,332 | A | | 7/1944 | Polydoroff |
| 5,231,698 | A | * | 7/1993 | Forcier ..................... 715/541 |
| 5,321,768 | A | | 6/1994 | Fenrich et al. ............. 382/178 |
| 5,327,342 | A | | 7/1994 | Roy ........................... 345/467 |
| 5,339,391 | A | | 8/1994 | Wroblewski et al. ...... 345/607 |
| 5,347,295 | A | | 9/1994 | Agulnick et al. .......... 345/156 |
| 5,367,453 | A | * | 11/1994 | Capps et al. ............... 715/531 |
| 5,390,281 | A | * | 2/1995 | Luciw et al. ................. 706/11 |
| 5,404,442 | A | * | 4/1995 | Foster et al. ............... 715/769 |
| 5,434,929 | A | * | 7/1995 | Beernink et al. .......... 382/187 |
| 5,442,742 | A | * | 8/1995 | Greyson et al. ........... 715/539 |
| 5,446,882 | A | * | 8/1995 | Capps et al. ............ 707/104.1 |
| 5,465,325 | A | * | 11/1995 | Capps et al. ............... 345/441 |
| 5,477,447 | A | * | 12/1995 | Luciw et al. ................. 704/9 |
| 5,479,596 | A | * | 12/1995 | Capps et al. ............... 715/539 |
| 5,491,495 | A | | 2/1996 | Ward et al. ................. 345/173 |
| 5,500,937 | A | * | 3/1996 | Thompson-Rohrlich .... 715/764 |
| 5,513,309 | A | * | 4/1996 | Meier et al. ................ 715/860 |
| 5,517,578 | A | | 5/1996 | Altman et al. ............. 382/181 |
| 5,528,743 | A | * | 6/1996 | Tou et al. ................... 715/541 |
| 5,544,295 | A | * | 8/1996 | Capps ........................ 345/473 |

(Continued)

FOREIGN PATENT DOCUMENTS

DE   40 26 852 A1   2/1991

(Continued)

OTHER PUBLICATIONS

Official Action issued on May 25, 2005 by the USPTO in connection with U.S. Appl. No. 10/186,837 (15 pages).

(Continued)

*Primary Examiner*—Matthew C. Bella
*Assistant Examiner*—Sath V. Perungavoor
(74) *Attorney, Agent, or Firm*—Merchant & Gould

(57) ABSTRACT

A computer-implemented method and system for erasing and editing an electronic document. A goal for computing devices that support the use of a stylus that can record handwriting strokes and present them in an electronic document is to present electronic ink that behaves similar to real ink from a pen. The nature of the electronic document and the electronic ink makes it difficult to edit the ink as one would with traditional pen and paper. However, an editing module accompanying the computing device can provide a user with functionality that facilitates the editing of electronic ink. Specifically, the editing module cna provide a feedback mechanisms, such as highlighting or shading, that indicates to the user which portions of handwriting strokes are selected for editing. Additionally, the editing module can recognize certain gestures and determine which handwriting strokes to apply the editing gesture to.

18 Claims, 11 Drawing Sheets

U.S. PATENT DOCUMENTS

| | | | |
|---|---|---|---|
| 5,544,358 A * | 8/1996 | Capps et al. ................. | 715/523 |
| 5,555,363 A * | 9/1996 | Tou et al. .................... | 715/541 |
| 5,559,942 A | 9/1996 | Gough et al. ............... | 715/802 |
| 5,579,467 A * | 11/1996 | Capps ......................... | 715/507 |
| 5,583,542 A * | 12/1996 | Capps et al. ................. | 345/173 |
| 5,588,105 A * | 12/1996 | Foster et al. ................ | 715/779 |
| 5,590,257 A * | 12/1996 | Forcier ....................... | 715/530 |
| 5,592,566 A * | 1/1997 | Pagallo et al. .............. | 382/187 |
| 5,594,640 A * | 1/1997 | Capps et al. ................. | 715/532 |
| 5,596,350 A * | 1/1997 | Capps et al. ................. | 345/173 |
| 5,596,694 A * | 1/1997 | Capps ......................... | 345/473 |
| 5,596,697 A * | 1/1997 | Foster et al. ................ | 715/810 |
| 5,602,570 A * | 2/1997 | Capps et al. ................. | 345/173 |
| 5,613,019 A * | 3/1997 | Altman et al. .............. | 382/311 |
| 5,634,102 A * | 5/1997 | Capps ......................... | 715/744 |
| 5,649,133 A | 7/1997 | Arquie ........................ | 715/764 |
| 5,655,136 A | 8/1997 | Morgan ...................... | 382/187 |
| 5,666,552 A * | 9/1997 | Greyson et al. ............. | 715/539 |
| 5,671,438 A * | 9/1997 | Capps et al. ................. | 715/539 |
| 5,682,439 A * | 10/1997 | Beernink et al. ............ | 382/187 |
| 5,710,831 A * | 1/1998 | Beernink et al. ............ | 382/189 |
| 5,745,716 A * | 4/1998 | Tchao et al. ................. | 715/777 |
| 5,760,773 A * | 6/1998 | Berman et al. .............. | 715/808 |
| 5,764,818 A * | 6/1998 | Capps et al. ................. | 382/317 |
| 5,768,418 A | 6/1998 | Berman et al. .............. | 382/187 |
| 5,778,404 A * | 7/1998 | Capps et al. ................. | 715/531 |
| 5,809,498 A | 9/1998 | Lopresti et al. ................ | 707/6 |
| 5,838,326 A | 11/1998 | Card et al. ................... | 715/775 |
| 5,838,819 A | 11/1998 | Ruedisueli et al. ......... | 382/187 |
| 5,864,635 A | 1/1999 | Zetts et al. .................. | 382/187 |
| 5,867,150 A | 2/1999 | Bricklin et al. .............. | 345/173 |
| 5,874,957 A | 2/1999 | Cline et al. .................. | 715/786 |
| 5,880,743 A * | 3/1999 | Moran et al. ................ | 345/473 |
| 5,953,735 A * | 9/1999 | Forcier ........................ | 715/541 |
| 5,963,208 A | 10/1999 | Dolan et al. ................. | 715/760 |
| 5,970,455 A | 10/1999 | Wilcox et al. ............... | 704/270 |
| 6,020,895 A * | 2/2000 | Azami ......................... | 345/619 |
| 6,021,218 A * | 2/2000 | Capps et al. ................. | 382/187 |
| 6,061,472 A | 5/2000 | Hullender et al. ........... | 382/187 |
| 6,069,626 A | 5/2000 | Cline et al. .................. | 715/786 |
| 6,081,829 A | 6/2000 | Sidnana ...................... | 709/203 |
| 6,108,445 A | 8/2000 | Uehara ........................ | 382/189 |
| 6,128,633 A | 10/2000 | Michelman et al. ......... | 715/525 |
| 6,154,219 A | 11/2000 | Wiley et al. ................. | 345/587 |
| 6,154,758 A | 11/2000 | Chiang ........................ | 715/541 |
| 6,188,405 B1 | 2/2001 | Czerwinski et al. ......... | 715/764 |
| 6,223,145 B1 | 4/2001 | Hearst ......................... | 703/22 |
| 6,279,014 B1 | 8/2001 | Schilit et al. ................ | 715/512 |
| 6,295,372 B1 | 9/2001 | Hawkins et al. ............. | 382/187 |
| 6,304,272 B1 | 10/2001 | Schanel et al. .............. | 345/676 |
| 6,337,698 B1 | 1/2002 | Keely, Jr. et al. ............ | 345/179 |
| 6,340,967 B1 | 1/2002 | Maxted ....................... | 345/173 |
| 6,345,389 B1 | 2/2002 | Dureau ........................ | 725/116 |
| 6,355,889 B1 | 3/2002 | Butcher et al. ........... | 178/18.03 |
| 6,487,567 B1 | 11/2002 | Michelmann et al. ....... | 715/525 |
| 6,487,569 B1 | 11/2002 | Lui et al. ..................... | 715/530 |
| 6,529,215 B2 | 3/2003 | Golovchinsky et al. ..... | 715/764 |
| 6,565,611 B1 | 5/2003 | Wilcox et al. ............... | 715/541 |
| 6,594,390 B2 | 7/2003 | Frink et al. .................. | 382/187 |
| 6,651,221 B1 | 11/2003 | Thompson et al. .......... | 715/541 |
| 6,654,035 B1 | 11/2003 | DeStefano ................... | 715/798 |
| 6,661,409 B2 | 12/2003 | Demartines et al. ........ | 345/173 |
| 6,678,865 B1 | 1/2004 | Pratley et al. ............... | 715/509 |
| 6,690,364 B1 | 2/2004 | Webb .......................... | 345/173 |
| 6,741,749 B2 | 5/2004 | Herbert, Jr. .................. | 382/246 |
| 6,801,190 B1 | 10/2004 | Robinson et al. ............ | 345/173 |
| 6,833,827 B2 | 12/2004 | Lui et al. ..................... | 345/173 |
| 6,836,759 B1 | 12/2004 | Williamson et al. ........ | 704/235 |
| 6,989,822 B2 | 1/2006 | Pettiross et al. ............. | 345/179 |
| 7,002,560 B2 | 2/2006 | Graham ....................... | 345/179 |
| 7,039,234 B2 | 5/2006 | Geidl et al. .................. | 382/187 |
| 7,079,713 B2 | 7/2006 | Simmons ..................... | 382/321 |
| 2001/0000960 A1 | 5/2001 | Dettloff | |
| 2002/0078035 A1 | 6/2002 | Frank et al. .................... | 707/3 |
| 2002/0097270 A1 | 7/2002 | Keely et al. ................. | 345/764 |
| 2002/0126153 A1 | 9/2002 | Withers et al. .............. | 345/773 |
| 2003/0119469 A1 | 6/2003 | Karr et al. | |
| 2003/0214491 A1 | 11/2003 | Kelly et al. .................. | 345/179 |
| 2003/0214531 A1 | 11/2003 | Chambers .................... | 345/764 |
| 2003/0215142 A1 | 11/2003 | Gounares et al. ............ | 382/190 |
| 2004/0003350 A1 | 1/2004 | Simmons et al. ............ | 715/517 |

FOREIGN PATENT DOCUMENTS

JP          3-270403          12/1991

OTHER PUBLICATIONS

Official Action issued on Dec. 17, 2004 by the USPTO in connection with U.S. Appl. No. 10/186,837 (13 pages).

U.S. Official Action dated Sep. 20, 2005 in U.S. Appl. No. 10/186,865.

U.S. Official Action dated Mar. 1, 2006 in U.S. Appl. No. 10/186,837.

U.S. Official Action dated Mar. 13, 1006 in U.S. Appl. No. 10/186,812.

U.S. Official Action dated Apr. 21, 1006 in U.S. Appl. No. 10/186,865.

Jakobsen, Thomas, "Advanced Character Physics," 2001, Proceedings, Game Developer's Conference 2001, pp. 1-17.

U.S. Final Official Action dated Aug. 10, 2006 cited in U.S. Appl. No. 10/186,874.

G. Fitzmaurice et al., "Tracking Menus," CHI 2003, vol. 5, No. 2, pp. 71-80, 2003.

Wilcox et al., Dynomite: "A Dynamically Organized Ink and Audio Notebook," Computer-Human Interaction, Mar. 27, 1997, pp. 186-193.

Copending U.S. Appl. No. 10/186,865 filed Jun. 28, 2002 entitled "System and Method for Automatically Recognizing Electronic Handwriting in an Electronic Document and Converting to Text".

Copneding U.S. Appl. No. 10/186,837 filed Jun. 28, 2002 entitled "Space Management for Electronic Documents".

Copending U.S. Appl. No. 10/186,812 filed Jun. 28, 2002 entitled "Resolving Document Object Collisions".

Copending U.S. Appl. No. 10/780,366 filed Feb. 17, 2004 entitled "Writing Guide for a Free-Form Document Editor".

Copending U.S. Appl. No. 10/782,133 filed Feb. 18, 2004 entitled "Glom Widget".

Copending U.S. Appl. No. 10/782,132 filed Feb. 18, 2004 entitled "Tapping to Create Writing".

U.S. Official Action dated Sep. 20, 2005 cited in U.S. Appl. No. 10/186,463.

U.S. Official Action dated Jul. 13, 2005 cited in U.S. Appl. No. 10/186,812.

U.S. Official Action dated Aug. 10, 2005 cited in U.S. Appl. No. 10/186,820.

U.S. Final Official Action dated Mar. 2, 2006 cited in U.S. Appl. No. 10/186,820.

U.S. Official Action dated Jun. 29, 2005 cited in U.S. Appl. No. 10/186,874.

U.S. Official Action dated Feb. 28, 2005 cited in U.S. Appl. No. 10/186,812.

* cited by examiner

Erasing a Word

390

391

392

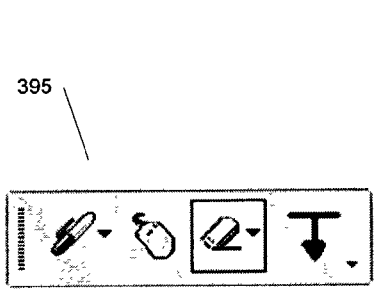
FIG. 3C
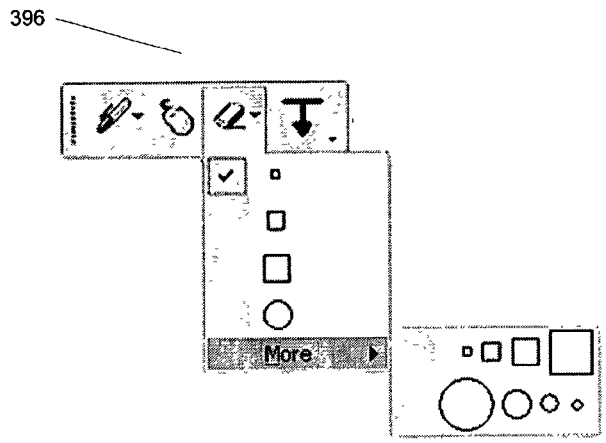
FIG. 3D
1. Scrub now
2. Scrub now
3. 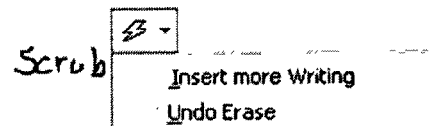
FIG. 3E
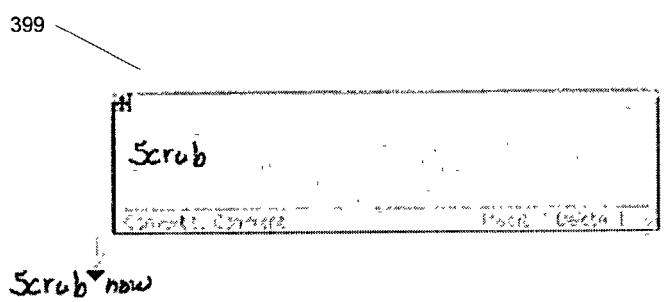
FIG. 3F
Scrub
Scrub now
FIG. 3G

470

← dragging eraser this way

Today is not Saturd▢

471

← dragging eraser this way

Today is not Saturd▢

472

← dragging eraser this way

Today is not Saturday

METHOD AND SYSTEM FOR EDITING ELECTRONIC INK

RELATED APPLICATIONS

This patent application is related to the following co-pending non-provisional patent applications: U.S. Patent Application Ser. No. 09/852,799 filed on May 11, 2001, entitled "Serial Storage of Ink and Its Properties" and U.S. Patent Application Ser. No. 09/430,150 filed on Oct. 29, 1999, entitled "Universal File Format for Digital Rich Ink Data." Both related applications are assigned to the Microsoft Corporation.

This patent application is also related to the following non-provisional patent applications: U.S. Patent Application Ser. No. 10/186,388, entitled "Writing Guide For A Free-Form Document Editor"; U.S. Patent Application Ser. No. 10/186,874, entitled "Method and System for Selecting Objects on a Display Device"; U.S. Patent Application Ser. No. 10/186,812, entitled "Resolving Document Object Collisions"; U.S. Patent Application Ser. No. 10/186,837, entitled "Space Management for Electronic Documents"; U.S. Patent Application Ser. No. 10/186,865, entitled "System and Method for Automatically Recognizing Electronic Handwriting in an Electronic Document and Converting to Text"; U.S. Patent Application Ser. No. 10/186,280, entitled "Method and System for Categorizing Data Objects with Designation Tools"; U.S. Patent Application Ser. No. 10/186,463, entitled "Method and System for Displaying and Linking Ink Objects with Recognized Text and Objects". These applications and the application herein are all being filed on the same date, Jun. 28, 2002, and are assigned to the Microsoft Corporation. All of the aforementioned applications are hereby incorporated by reference.

TECHNICAL FIELD

The present invention is generally directed to electronic ink used in computing devices. More specifically, the present invention provides a method and system for more accurate editing and erasing of electronic ink.

BACKGROUND OF THE INVENTION

One of the simplest methods of recording and communicating information is the traditional method of writing the information down on a piece of paper with a writing instrument such as a pen. Writing information by hand on a piece of paper is inexpensive and can be done quickly and easily with little preparation. The traditional method is also flexible in that a writer can generally write in any format anywhere on the page. One of the limitations with handwritten work is that it is not easily manipulated or transferred to other contexts. In other words, changing or transferring a piece of handwritten text typically requires rewriting the text on another medium.

With the widespread use of personal computers, textual information often is recorded using word processing software running on a personal computer. The advantage of such electronic methods of recording information is that the information can be easily stored and transferred to other remote computing devices and electronic media. Such electronically recorded text can also be easily corrected, modified, and manipulated in a variety of different ways.

Typical computer systems, especially computer systems using graphical user interface (GUI) systems such as Microsoft WINDOWS, are optimized for accepting user input from one or more discrete input devices. Common input devices include a keyboard for entering text and a pointing device, such as a mouse with one or more buttons, for controlling the user interface. The keyboard and mouse interface facilitates creation and modification of electronic documents including text, spreadsheets, database fields, drawings, and photos.

One of the limitations with conventional GUI systems is that a user must generally type the text they are entering into the personal computer using the keyboard. Entering text using a keyboard is generally slower and more cumbersome than handwriting. Although recent advances have been made in reducing the size of personal computers, they are still not as portable and easily accessible as traditional paper and pen. Furthermore, traditional pen and paper provide the user with considerable flexibility for editing a document, recording notes in the margin, and drawing figures and shapes. In some instances, a user may prefer to use a pen to mark-up a document rather than review the document on-screen because of the ability to freely make notes outside of the confines of the keyboard and mouse interface.

To address the shortcomings of traditional keyboard and mouse interfaces, there have been various attempts to create an electronic tablet that can record handwriting. Such electronic tablets typically comprise a screen and a handheld device that is similar to a pen. A user can write with the handheld device on the screen of the electronic tablet in a similar manner to traditional pen and paper. The electronic tablet can "read" the strokes of the user's handwriting with the handheld device and recreate the handwriting in electronic form on the screen with "electronic ink". This electronic table approach can be employed in a variety of ways, including a personal computer and a handheld computing device.

Recently, other computer systems have been developed that provide for more sophisticated creation and manipulation of electronic ink. For example, the Microsoft READER application permits one to add electronic ink to a document. The system stores the ink and provides it a user when requested. Other applications (for example, drawing applications associated with the Palm and PocketPC operating systems) permit the capture and storage of drawings. These drawings include other properties associated with ink strokes used to make up the drawings. For instance, line width and color may be stored with the ink. One goal of these systems is to replicated the look and feel of physical ink being applied to a piece of paper. However, physical ink on paper can have significant amounts of information not captured by the electronic collection of coordinates and connecting line segments. Some of this information may include the thickness of the pen tip used (as seen through the width of the physical ink), the shape of the pen tip, and the speed at which the ink was deposited.

In spite of the advances in electronic tablets and electronic ink, there are still several limitations with the performance of such electronic handwriting devices. One of those limitations concerns the ability to quickly and accurately edit electronic handwriting. Conventional approaches to editing handwriting strokes on an electronic tablet are limited in that a user cannot quickly and easily identify a portion of a word or drawing for erasing or editing. The conventional method is further limited in that a user is often unsure about which handwriting strokes of the word or drawing have been selected for editing until the edit is actually made.

In view of the foregoing, there is a need in the art for a system and method that allows a user to quickly and accurately edit electronic ink. Specifically, there is a need for an editing function that provides feedback to the user concerning the handwriting strokes that are selected for editing. The feedback element of the editing function should be visual, such as shading the handwriting strokes that have been selected before they are edited. The feedback component must be precise so that a user can edit a handwriting stroke that is a portion of a word or drawing. The feedback capability should also allow the user to edit relatively large amounts of text expeditiously. It is further desirable for an editing function to recognize handwriting gestures associated with editing. In other words, the editing function should be able to recognize certain gestures made by the user and associate them with particular handwriting strokes. For example, a "strikethrough" gesture, such as a single or multiple line cross-out, can be associated with a particular handwritten word that it to be edited. The editing function should also provide the user with options to select, modify, or delete handwriting strokes associated with an editing gesture.

SUMMARY OF THE INVENTION

The present invention is generally directed to a method and system for editing handwritten strokes displayed as electronic ink on a computing device, such as an electronic tablet. The present invention improves upon existing approaches in that a user can more accurately and quickly select handwriting strokes for editing. For example, a user can select certain handwriting strokes for editing by simply engaging the strokes with the handheld device. Alternatively, the user may actually make a gesture with the handheld device that is associated with editing, such as a strikethrough. An editing software module can interpret the user's handwriting gestures and select handwriting strokes for editing. The editing software module can also supply feedback to the user that is attempting to edit handwriting strokes. The feedback can be provided to the user in a variety of ways. One method is to highlight or shade those handwriting strokes that have been selected by the user before they are actually edited. Another method is to provide options to the user, such as in a pop-up menu, for selecting, modifying, or deleting handwriting strokes that have been selected by the user for erasing. The feedback feature allows the user to know which handwritten strokes will be edited and thus, allows the user to more quickly and accurately perform editing on electronic documents containing electronic ink.

In one aspect, the invention comprises a method for erasing electronic ink displayed on a computing device. A user writing on a computing device with a handheld device, such as a stylus, can engage an erase mode for easing with the stylus. The user can engage the electronic ink displayed on the computing device with the stylus and a parse software module provides the user with feedback as to which strokes in the electronic ink are selected for erasing. The feedback is typically in a visual form such as shading or highlighting. The feedback allows the user to know which stroke or strokes in the electronic ink are going to be erased before an ink processing module actually erases it. Once the user disengages the stylus from the computing device, the selected handwriting strokes are erased.

In another aspect, the invention comprises a method for erasing a plurality of words displayed on the graphical user interface (GUI) of a computing device. A user can engage an erase mode on the computing device and touch the displayed words that are to be erased with a stylus. Alternatively, the user's stylus may hover over the words to be erased without actually physically touching the screen of the computing device with the stylus. The user can drag the stylus over the words that are to be erased and the parse module will alter the words to show that they have been selected for erasing. For example, the altered words can be shaded a certain color or highlighted. When the user lifts the stylus away from the computing device, those words that have been selected are erased. A layout module can also shift the remaining words after erasing such that any gap left by the erased words is filled.

In yet another aspect, the invention provides a method for erasing electronic ink displayed on a computing device. For example, the electronic ink may comprise a drawing displayed on the computing device. A user operating a stylus can select an erase mode on the computing device and engage the computing device with the stylus. As the user drags the stylus over various portions of the drawing in electronic ink, a parse module can modify those portions that are proximate to the stylus. The ink processing module can be set to erase entire handwriting strokes engaged by the stylus. Alternatively, the ink processing module can also be set to erase only those portions of handwriting segments directly engaged by the stylus.

In yet another aspect, the invention provides a method for editing electronic ink displayed on a computing device with a gesture. For example, a user writing on a computing device with a stylus may want to use common gestures for editing a document such as a typical strikethrough or cross-out. The parse software module can associate recognized editing gestures with particular handwriting strokes. Specifically, the parse module creates a gesture coverage box around the user's gesture and an object coverage box around any nearby ink objects. Comparing the object coverage box and the gesture coverage box, the parse module can determine which ink object the user wants to edit. The parse module can also provide the user with options for editing the ink object once the gesture is recognized and associated with particular handwriting strokes. For example, the edited word can be highlighted, displayed with a strikethrough, or erased.

Finally, in yet another aspect, the invention comprises a system for facilitating the editing of electronic ink displayed on a computing device. The computing device is operable for receiving signals from a handheld device and using an ink processing software module to render those signals as electronic ink strokes. The electronic ink strokes can be rendered on a GUI coupled to the computing device. A classifier module coupled to the computing device can identify whether displayed electronic ink is a word or drawing. An parse module coupled to the computing device allows a user to edit entire ink strokes or portions of ink strokes. The parse module also can provide the user with feedback as to which ink strokes have been selected for editing before they are actually edited. The feedback mechanism assists users by enabling faster and more accurate editing.

These and other aspects of the invention will be described in the detailed description in connection with the drawing set and claim set.

BRIEF DESCRIPTION OF THE DRAWINGS

FIG. 4B contains representative displays associated with erasing a plurality of words in accordance with an exemplary embodiment of the present invention.

FIG. 6B contains representative displays of various editing gestures in accordance with an exemplary embodiment of the present invention.

DETAILED DESCRIPTION OF THE EXEMPLARY EMBODIMENTS

Figure 1:
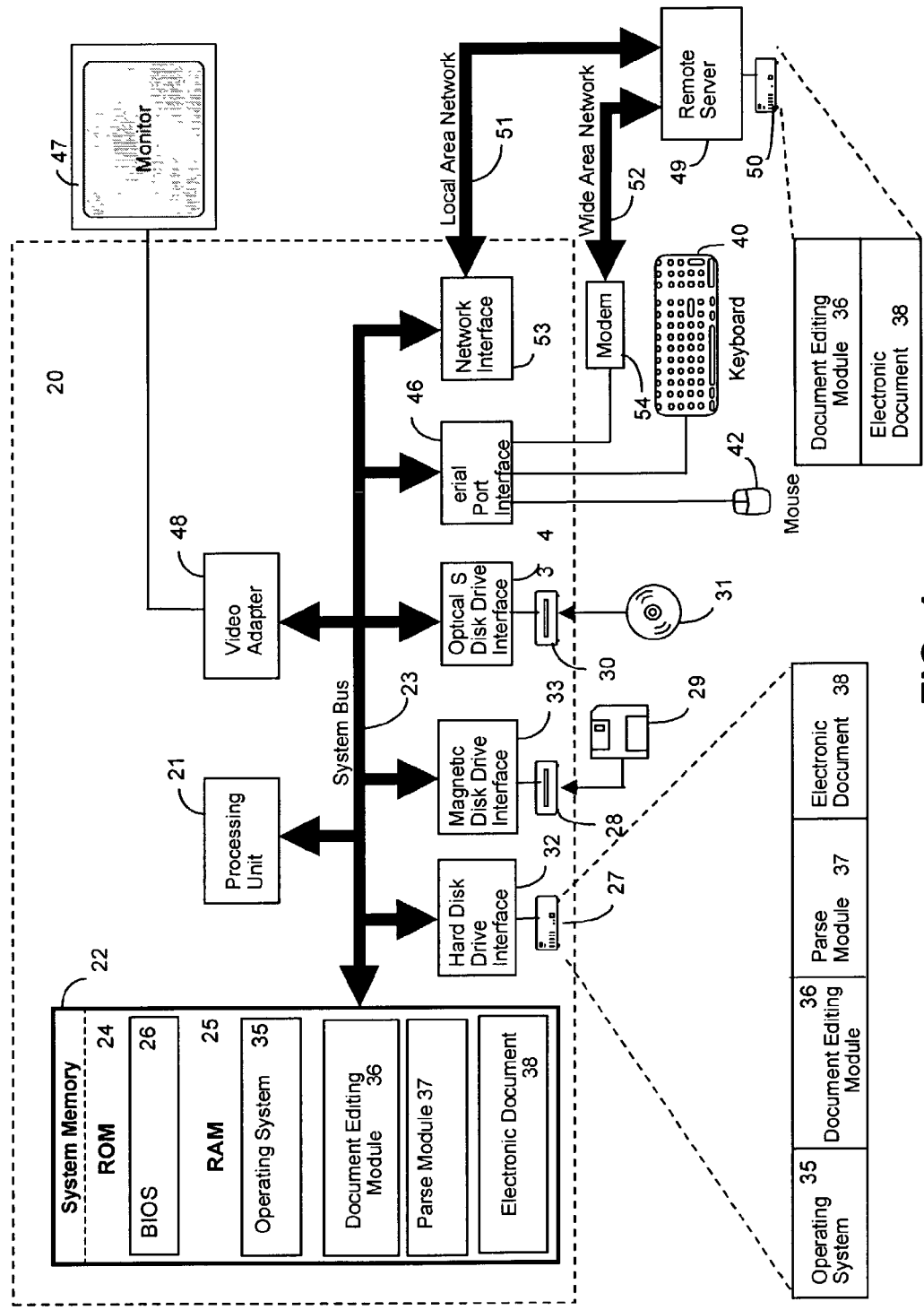
FIG. 1 is a functional block diagram illustrating the operating environment for an exemplary embodiment of the present invention.

The present invention enhances the performance of computing devices, such as electronic tablets, that convert a user's handwriting strokes into electronic ink in an electronic document. Specifically, the present invention improves upon the user's ability to edit electronic ink. A user typically performs editing on electronic ink with a handheld device, such as a stylus, that accompanies the electronic tablet. The present invention allows a user to quickly and precisely identify electronic ink strokes that are to be edited. For example, a parsing module can take recognized editing gestures, such as a strikethrough, and accurately identify which handwriting strokes the gesture is associated with. The parsing module can also provide feedback to the user as to which handwriting strokes are selected for editing. For example, the parsing module can highlight or shade the particular strokes in a word that are selected to be erased before the erasing function is performed. The feedback mechanism assists the user in quickly identifying which handwriting strokes of the electronic ink are selected for editing.

Although the exemplary embodiments will be generally described in the context of a software module and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices and input devices. These processes and operations may utilize conventional computer components in a distributed computing environment, including remote file servers, remote computer servers, and remote memory storage devices. Each of these conventional distributed computing components is accessible by a processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection or data stored within a memory storage device and represent specific electrical or magnetic elements. These symbolic representations are the means used by those skilled in the art of computer programming and computer construction to most effectively convey teachings and discoveries to others skilled in the art.

The present invention includes a computer program which embodies the functions described herein and illustrated in the appended display screens and flow charts. However, it should be apparent that there could be many different ways of implementing the invention in computer programming, and the invention should not be construed as limited to any one set of computer program instructions. Further, a skilled programming would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 20 suitable for supporting the operation of the preferred embodiment of the present invention. As shown in FIG. 1, the personal computer 20 operates in a networked environment with logical connections to a remote computer 49. The logical connections between the personal computer 20 and the remote computer 49 are represented by a local area network 51 and a wide area network 52. Those of ordinary skill in the art will recognize that in this client/server configuration, the remote computer 49 may function as a file server or computer server.

The personal computer 20 includes a processing unit 21, such as "PENTIUM" microprocessors manufactured by Intel Corporation of Santa Clara, Calif. The personal computer also includes system memory 22, including read only memory (ROM) 24 and random access memory (RAM) 25, which is connected to the processor 21 by a system bus 23. The preferred computer 20 utilizes a BIOS 26, which is stored in ROM 24. Those skilled in the art will recognize that the BIOS 26 is a set of basic routines that helps to transfer information between elements within the personal computer 20. Those skilled in the art will also appreciate that the present invention may be implemented on computers having other architectures, such as computers that do not use a BIOS, and those that utilize other microprocessors.

Within the personal computer 20, a local hard disk drive 27 is connected to the system bus 23 via a hard disk drive interface 32. A magnetic disk drive 28, which is used to read or write a floppy drive 29, is connected to the system bus 23 via a magnetic disc drive interface 33. An optical drive 30, such as a CD-ROM or DVD drive, which is used to read an optical disk 31, is connected to the system bus 23 via an optical disk drive interface 34. A user enters commands and information into the personal computer 20 by using input devices, such as a keyboard 40 and/or pointing device, such as a mouse 42, which are connected to the system bus 23 via a serial port interface 46. Other types of pointing devices (not shown in FIG. 1) include track pads, track balls, pens, stylus, head trackers, data gloves and other devices suitable for positioning a cursor on a computer monitor 47. The monitor 47 or other kind of display device is connected to the system bus 23 via a video adapter 48.

The remote computer 49 in this networked environment is connected to a remote memory storage device 50. This remote memory storage device 50 is typically a large capacity device such as a hard disk drive, CD-ROM or DVD drive, magneto-optical drive or the like. Those skilled in the art will understand that program modules, such as a document editing module 36 and parse module 37 used to edit an electronic document 38, are provided to the personal computer 20 or the remote computer 49 via computer-readable media. The personal computer 20 is connected to the remote computer 49 by a network interface 53, which is used to communicate over the local area network 51.

In an alternative embodiment, the personal computer 20 is also connected to the remote computer 49 by a modem 54, which is used to communicate over the wide area network 52, such as the Internet. The modem 54 is connected to the system bus 23 via the serial port interface 46. The modem 54 also can be connected to the public switched telephone network (PSTN) or community antenna television (CATV) network. Although illustrated in FIG. 1 as external to the personal computer 20, those of ordinary skill in the art can recognize that the modem 54 may also be internal to the personal computer 20, thus communicating directly vai the system bus 23. It is important to note that connection to the remote computer 49 via both the local area network 51 and the wide area network 52 is not required, but merely illustrates alternative methods of providing a communication path between the personal computer 20 and the remote computer 49.

Although other internal components of the personal computer 20 are not shown, those of ordinary skill in the art will appreciate that such components and the interconnection between them are well known. Accordingly, additional details concerning the internal construction of the personal computer 20 need not be disclosed in connection with the present invention.

Those skilled in the art will understand that program modules, such as an operating system 35, a document editing module 36, a parse module 37, and data are provided to the personal computer 20 via computer-readable media. In the preferred computer, the computer-readable media include the local or remote memory storage devices, which may include the local hard disk drive 27, floppy disk 29, CD-ROM or DVD 31, RAM 25, ROM 24, and the remote memory storage device 50. In the preferred personal computer 20, the local hard disk drive 27 is used to store data and programs.

Figure 2:
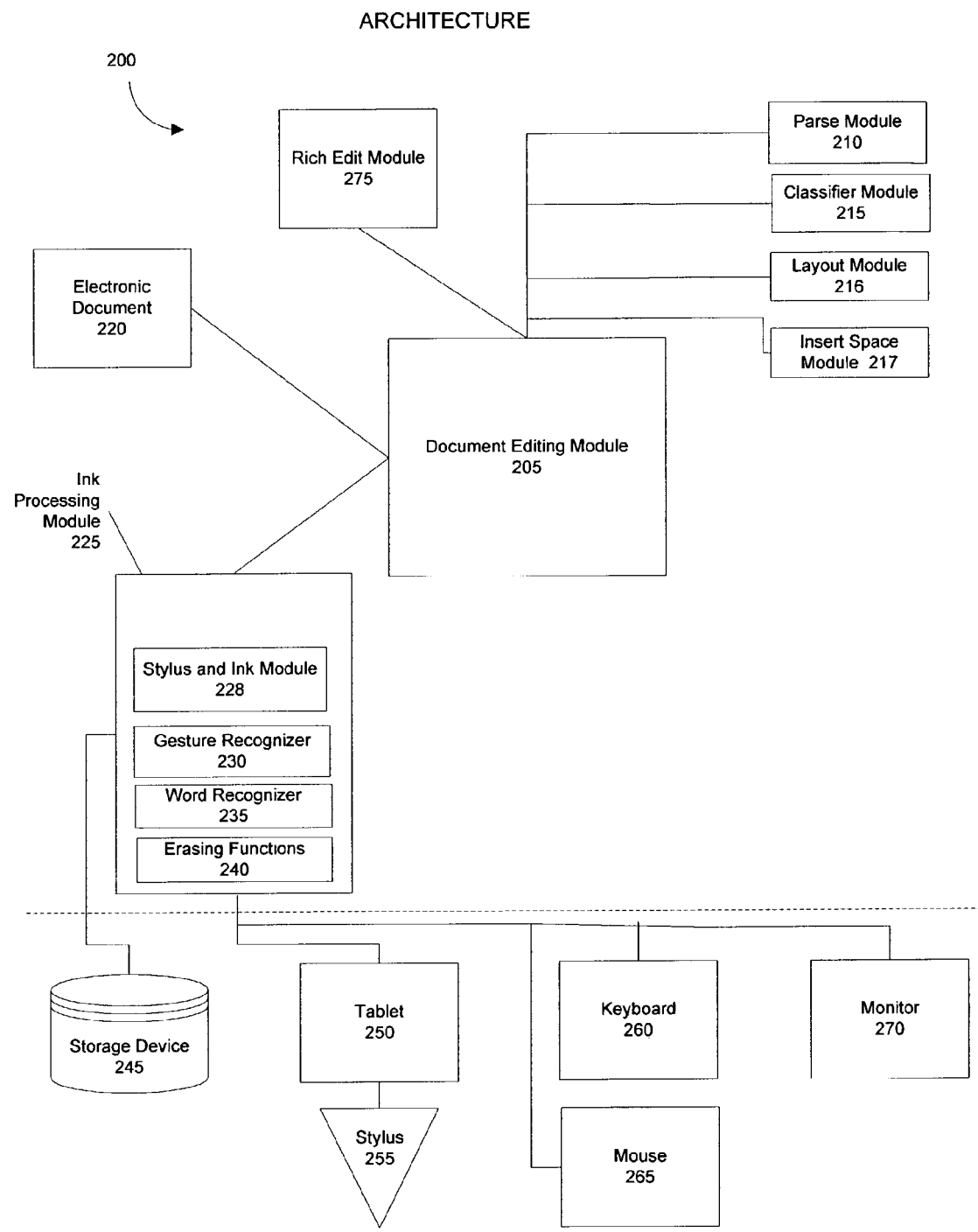
FIG. 2 is an architecture diagram illustrating the functional components in accordance with an exemplary embodiment of the present invention.

Referring to FIG. 2, an exemplary architecture 200 is illustrated for editing electronic ink in accordance with an embodiment of the present invention. FIG. 2 shows typical hardware and software components used in operating an exemplary embodiment of the invention from a functional perspective. An exemplary document editing module 205 and parse module 210 are shown coupled to other software modules that can reside locally on the personal computer 20 or on the remote computer 49. FIG. 2 also shows exemplary input/output devices that communicate with the software modules. Conventional input devices are represented by the keyboard 260 and the pointing device (mouse) 265. A user can enter commands and information into the computer 20 using the input devices. Other input devices (not shown) may include a microphone, joystick, game pad, satellite dish, and scanner. A conventional output device, such as monitor 270, is used to display information from the computer 20. Other output devices (not shown) can include a printer or speaker.

Other hardware components shown in FIG. 2 include an electronic tablet 250 and an accompanying handheld device, such as a stylus, 255. The electronic tablet 250 can include the personal computer 20 or can be a distinct device coupled to the personal computer 20. The tablet 250 and stylus 255 are used to input handwritten strokes which are converted to collections of data that can be represented as electronic ink. In alternative embodiments of the invention, input device other than a stylus may be used. Furthermore, some electronic tablets are designed such that a person could use their finger as the stylus. The electronic ink may be displayed on either the electronic table 250, the monitor 270, or both. Although the electronic tablet 250 and the monitor 270 are illustrated as being distinct, in the preferred embodiment they are either coupled or form a single component. The joint tablet/monitor component has the ability to display information and receive input from the stylus 255. Also shown among the hardware components is a conventional electronic storage device 245.

In the representative architecture 200 all of the hardware components are coupled to an ink processing software module 255. It should be understood by those skilled in the art that FIG. 2 is merely representative and that in practice the hardware components typically are coupled to the elements shown in FIG. 1. The ink processing module 225 is operable for receiving data from the electronic tablet 250 and/or the stylus 255 and rendering that data as electronic ink. In the preferred embodiment, the ink processing module 225 is a collection of software modules that perform different tasks for rendering handwriting strokes as electronic ink. For example, the stylus and ink modules 228 can receive data describing the positions and angles of the stylus for a series of handwriting strokes. The stylus and ink module 228 can interpret the data for rendering electronic ink.

Other software modules associated with the ink processing module 225, such as a gesture recognizer 230 and wore recognizer 235, can be designed to identify certain handwriting strokes and assign them a particular significance. For example, certain gestures such as a cross-out may be recognized and associated with other editing processes. The word recognizer 235 can identify which handwriting strokes comprise a word and store those strokes as an ink object. The ink processing module 225 can also include an erasing functions module 240 for removing electronic ink that has been previously rendered.

Although ink processing modules are known in the art and necessary for an electronic tablet to function, what is needed is a document editing module, such as the one shown in FIG. 2 that enhances the performance of an electronic tablet. Specifically, document editing module 205 facilitates the manipulation of electronic ink so that a user can create and manipulate an electronic document 220 with greater ease and sophistication. The document editing module 205 typically comprises a collection of software modules for controlling and manipulating electronic ink rendered on the monitor 270. For example, a parse module 210 can be used to identify handwriting strokes that are selected by the user for editing. Selected strokes may be highlighted or shaded to assist the user to identifying which strokes are to be edited. A classifier module 215 can identify certain handwriting strokes as being part of a word or drawing. Software modules such as the layout module 216 and the insert space module 217 can be designed to control how electronic ink is rendered and moved. The editing modules shown in FIG. 2 are representative and those skilled in the art should understand that other modules may also be part of or coupled to the document editing module 205. For example, the document editing module may also work with a rich edit module 275 that provides added functionality.

Figure 3A:
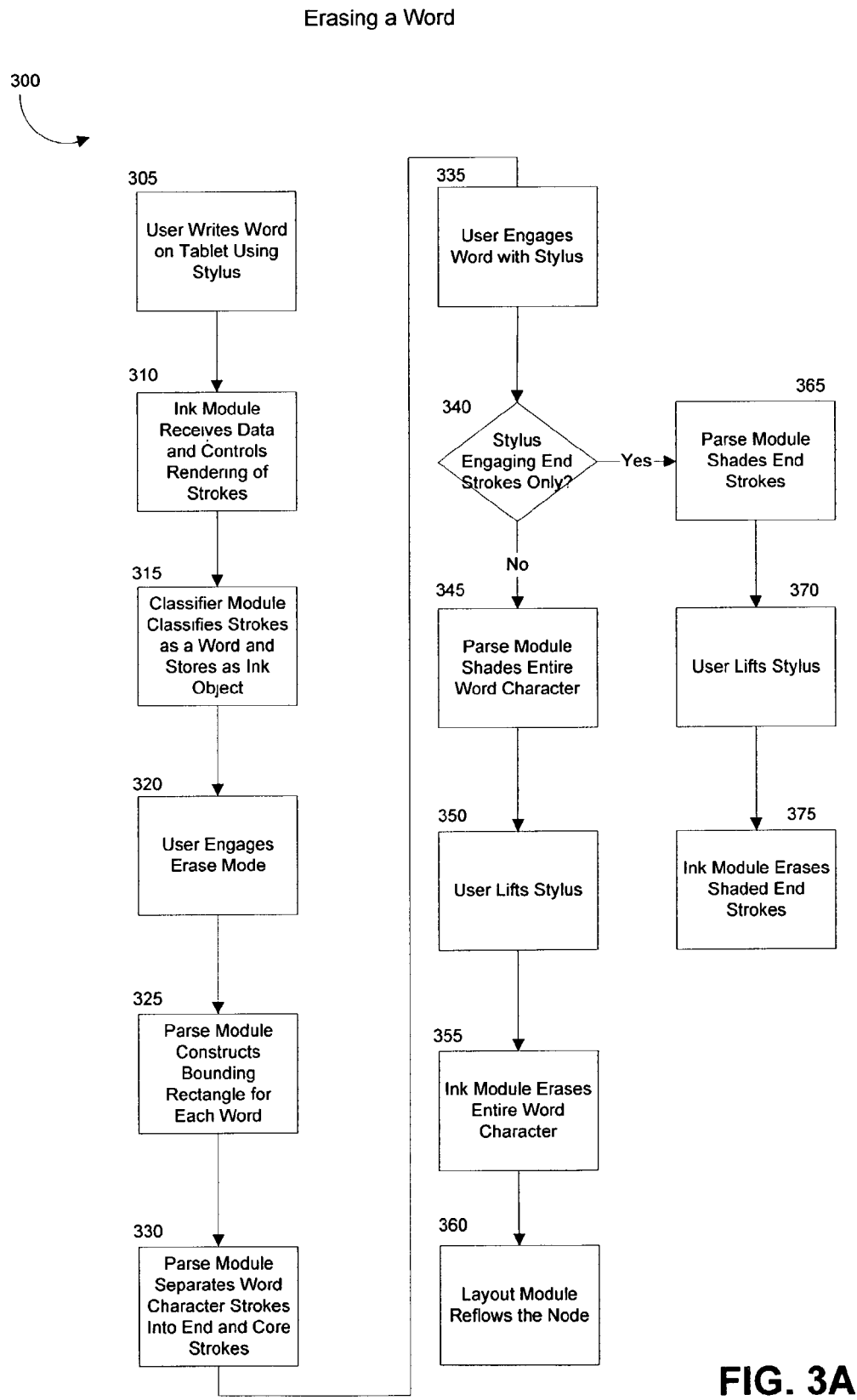
FIG. 3 is a logic flow diagram illustrating a process for erasing a word in accordance with an exemplary embodiment of the present invention.
FIG. 3B provides representative displays associated with erasing a word in accordance with an exemplary embodiment of the present invention.
FIG. 3C provides a representative display of various writing modes in accordance with an exemplary embodiment of the present invention.
FIG. 3D provides a representative display of various eraser configurations in accordance with an exemplary embodiment of the present invention.
FIG. 3E provides a representative display of an exemplary erasing procedure in accordance with an exemplary embodiment of the present invention.
FIG. 3F provides a representative display of an exemplary erasing procedure in accordance with an exemplary embodiment of the present invention.
FIG. 3G provides a representative display of an exemplary erasing procedure in accordance with an exemplary embodiment of the present invention.

FIG. 3A illustrates an exemplary process 300 for erasing a word using the document editing software module 205. In step 305, a user can begin by writing a word on the electronic tablet 250 using the stylus 255. Alternatively, the user may also use a pointing device 265, such as a mouse, to write a word on the tablet 250. In step 310, the ink processing module 225 receives data from the electronic tablet 250 and the stylus 255 that describes the physical motions of the stylus. The ink processing module 225 uses the data to render the handwriting strokes as electronic ink on the monitor 270. A variety of modules within the ink processing module 225 can be used to recognize handwriting gestures and assist in the rendering and removing of the electronic ink.

In step 315, a classifier module 215 within the document editing module 205 can classify the handwriting strokes. In this exemplary embodiment, the classifier module 215 classifies the handwriting strokes as a word and stores the strokes as an ink object. The significance of the classification process is that words and drawings are handled differently by the ink processing module 225 and the document editing module 205. If a word or a portion of the word needs to be erased, in step 320 the user can engage an erase mode on the stylus 255 or the electronic tablet 250. An exemplary method for engaging the erase mode is illustrated in the representative display 395 in FIG. 3C. Alternatively, the user may engage the erase mode by activating a button on the stylus 255. As shown in representative display 396, the user may also select the size and configuration of the erasing fields as controlled by the stylus 255.

Figure 3B:
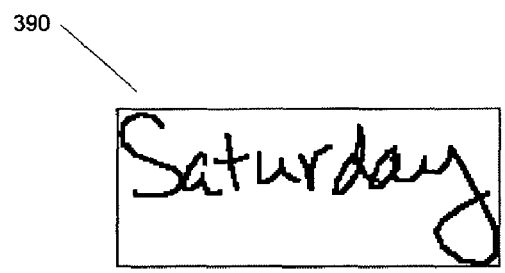
Figure 3B:
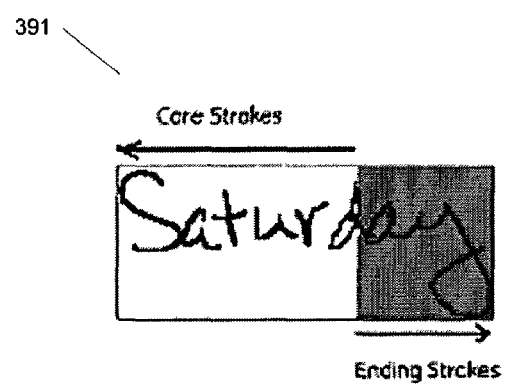
Figure 3B:
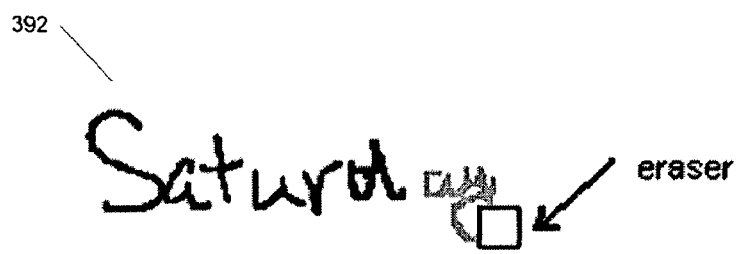

Once in erase mode, in step 325, the parse module 210 constructs a bounding rectangle around the word the user has just written on the electronic tablet 250. An exemplary bounding rectangle is illustrated in the representative display 390 in FIG. 3B. In step 330, the parse module 210 will separate the word into end strokes and core strokes. The representative display 391 in FIG. 3B illustrates the division of the word Saturday into core strokes and end strokes. Alternative embodiments of the present invention may not distinguish between core and end strokes, or may divide words into more than two sets of strokes. More fine division of words provides greater precision for the user, but also increases the amount of processing the parse module 210 must perform.

A user can begin erasing strokes in the word by engaging the displayed electronic ink with the stylus 255. Engaging the displayed electronic ink can include physically touching the area where the ink is displayed or simply hovering over that particular area with the stylus. When a user engages the end strokes with the stylus 255, in step 335, the parse module's feedback mechanism differentiates the end strokes from the core strokes in the word. As illustrated in the representative display 392 in FIG. 3B, the stylus 255 is engaging the end strokes in the word Saturday, and these strokes have been shaded a different color than remainder of the word. If the stylus 255 only engages the end strokes, then the parse module 210 will only shade the end strokes in step 365. When the user lifts the stylus 255 from the tablet 250 in step 370, the ink processing module 225 will erase the shaded end strokes in step 375.

Alternatively, if in step 340, the stylus 255 engages the core strokes as well as the end strokes in the word, the parse module 210 will shaded the entire word. In step 350, when the user lifts the stylus 255 from the electronic tablet 250, the ink module 225 will erase the entire word. Once the entire word is erased, in step 360, the layout module 216 will reflow the node containing the handwriting strokes so as to eliminate the space left by the erased word. The representative display 397 in FIG. 3E illustrates the reflow process when a word is erased.

FIG. 3E illustrates the erasing of a word using an eraser tool. Image 1 of FIG. 3E depicts using a square shaped tool to erase the word "here." Image 2 depicts the subsequent reflow process, or layout correction, that automatically closes the gap between words nearby the erased strokes. An on-object user interface item (i.e. a lightning bolt) provides a visual hint to the user that an automated action has occurred. When a user engages the on-object user interface with an input device in Image 3, the user may be presented with a list of actions that may be taken with regard to the automated action. FIG. 3F illustrates erasing of a word using a gesture. Similar to FIG. 3E, the word "here" is erased, although this time by scratching through the word using a scratch gesture. As with FIG. 3E, the ink words automatically reflow the close the gap, and an on-object user interface item lets the user know that the automated action has occurred. FIG. 3G illustrates an ink entry window provided when a user wishes to "Insert more Writing" where another word was previously erased. A user may initiate the ink entry window by selecting a menu item, such as the one displayed in Image 3 of FIG. 3E.

Figure 4A:
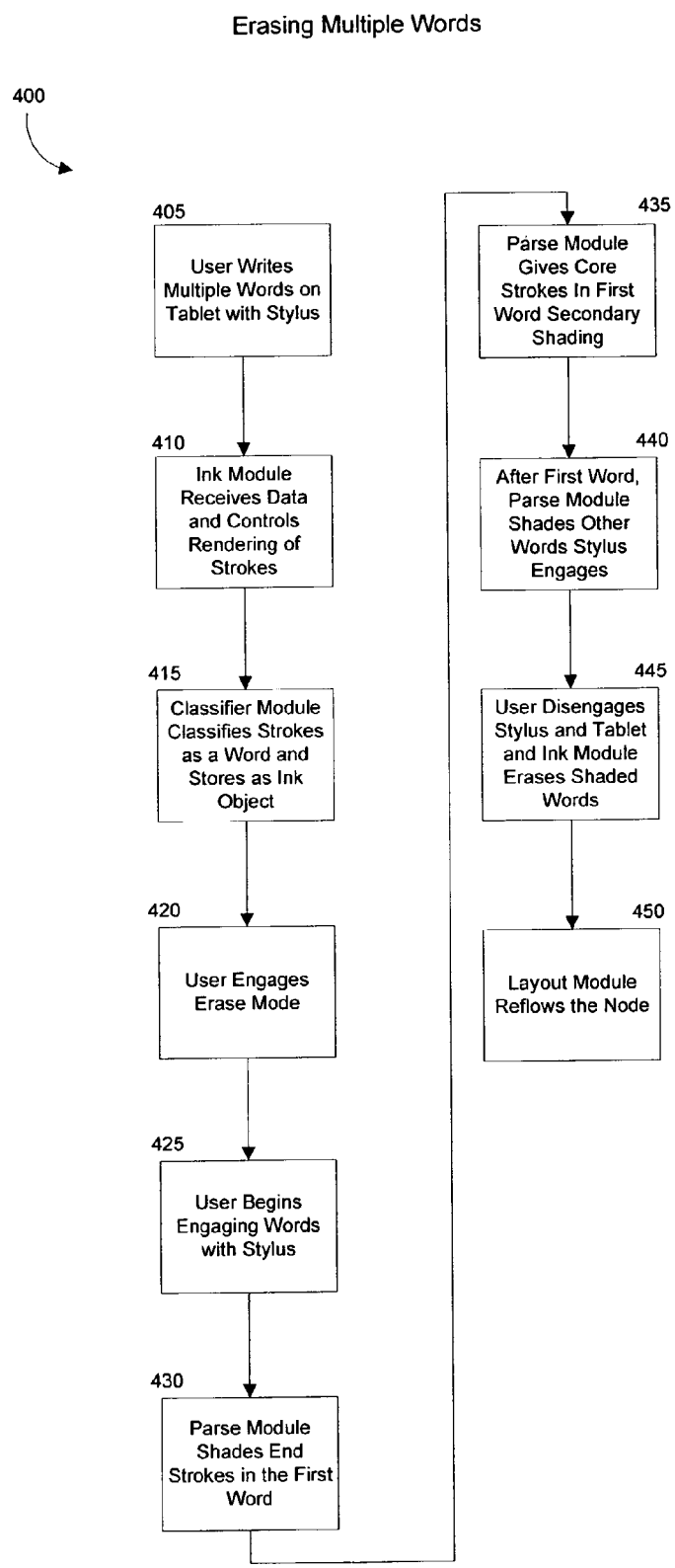
FIG. 4A is a logic flow diagram illustrating a process for erasing a plurality of words in accordance with an exemplary embodiment of the present invention.

Referring to FIG. 4A, an exemplary process 400 for erasing multiple words written on the electronic tablet 250 is illustrated. In step 405, the user can write multiple words on the electronic tablet 250 using the stylus 255. In step 410, the ink processing module 225 receives data from the electronic tablet 250 and the stylus 255 describing the user's handwriting strokes. The ink processing module 225 interprets the data and renders the handwriting strokes as electronic ink on the monitor 270. As the user is writing on the electronic tablet 250, the classifier module 215 is continually classifying the handwritten strokes. Typically, the strokes are either classified as a word or a drawing. The classifying process assists the writing module in manipulating the handwriting strokes. In step 415, the classifier module 215 classifies the user's handwriting strokes as a word and stores these strokes as an ink object.

If the user decides to erase multiple words, they can engage the erase mode in step 420. Erasing multiple words requires greater speed and less precision on the part of the parse module 210. Accordingly, in the present embodiment of the invention, when a user is erasing multiple words the parse module 210 can forego differentiating between core strokes and end strokes. In step 425, the user begins engaging the words on the tablet 250 with the stylus 255. For example, the user may begin by dragging the stylus 255 at the end strokes of one word, as illustrated in the representative display 470 in FIG. 4B. As the stylus 255 engages the end strokes in step 430, the parse module 210 shades the end strokes in the word.

In the preferred embodiment, if the stylus 255 is within a certain proximity of the core strokes of that word, the parse module 210 may also give the core strokes a secondary shading in step 435. This secondary shading is a feedback mechanism that allows the user to see which strokes may be selected next for erasing if the user continues to drag the stylus across the word. In representative display 471, the letter "d" in Saturday has secondary shading to show that it will be selected next if the user continues to drag the stylus 255.

As the user drags the stylus 255 across the other words written on the tablet 250, in step 440, the parse module 210 also triggers a feedback mechanism for these words. As illustrated in the representative display 472, when the user is deleting multiple words, instead of segmenting the strokes of the word, the feedback mechanism shades the entire word for increased efficiency. In step 445, when the user disengages the stylus 255 from the electronic tablet 250, the ink processing module 225 erases those words that are shaded. Lastly, in step 450, the layout module 216 will engage a reflow mechanism to eliminate the space created by the erased words. In alternative embodiments of the present invention, some of the foregoing steps may be eliminated or performed in a different order. For example, the secondary shading and reflow steps are not necessary elements to performing the invention.

Figure 5:
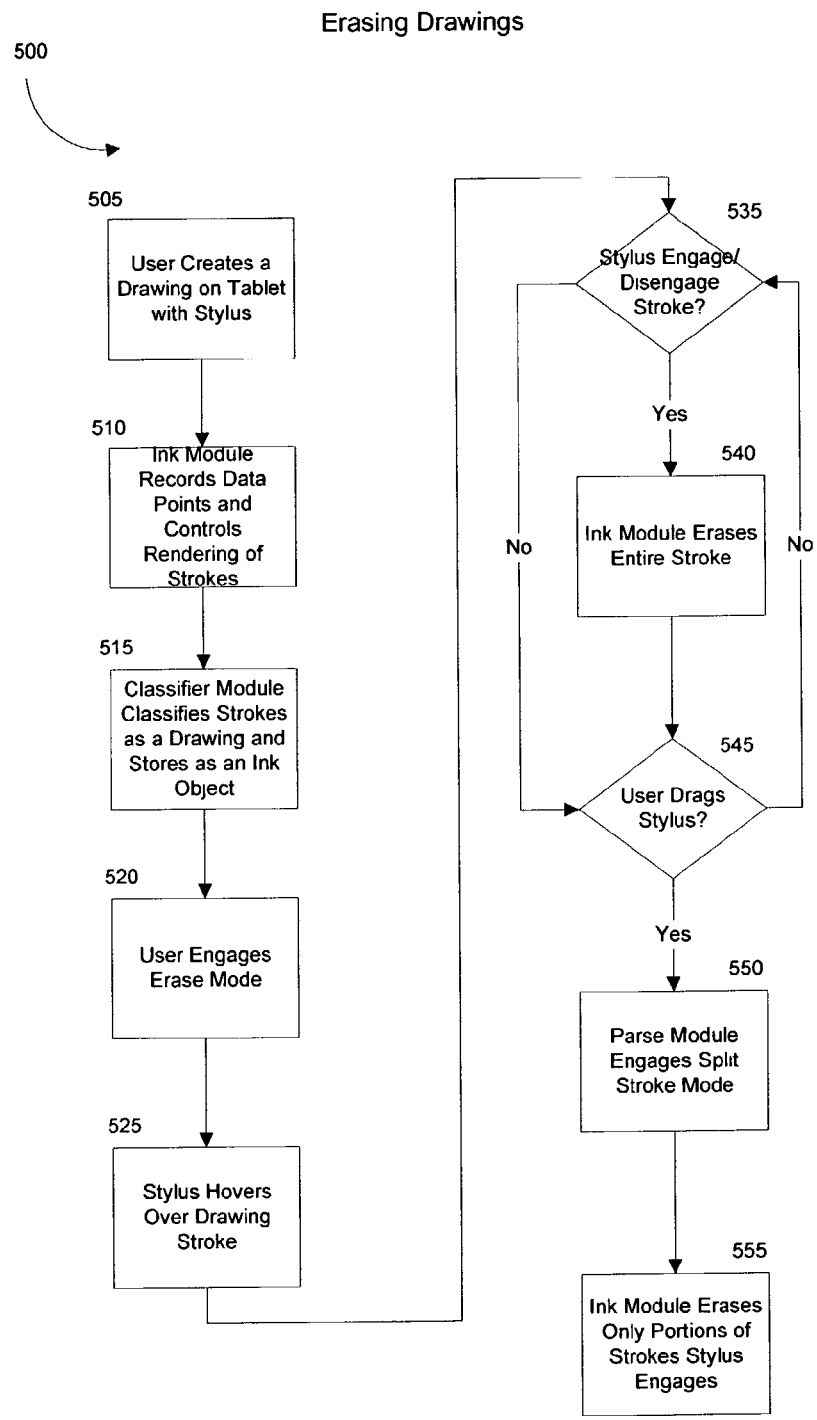
FIG. 5 is a logic flow diagram illustrating a process for erasing strokes in a drawing in accordance with an exemplary embodiment of the present invention.

Another embodiment of the invention concerns the erasing of handwritten strokes in a drawing, as opposed to handwritten strokes of a word. In FIG. 5, an exemplary process 500 for erasing handwritten strokes in a drawing is illustrated. Drawing strokes typically encompass any handwritten strokes that cannot be classified as a word, including tables, symbols, arrows, and diagrams. In step 505, the user can create a drawing on the electronic tablet 250 using the stylus 255. Alternatively, the user may also import a drawing from another source and edit that drawing with the stylus 255 and electronic tablet 250. In step 510, the ink processing module 225 receives data from the stylus 255 and electronic tablet 250 describing the physical positions of the stylus. The ink processing module 225 uses the data to render electronic ink representing the user's handwriting strokes. In step 515, the classifier module 215 can interpret the handwriting strokes and determine that they are part of a drawing, as opposed to a word. The classifier module 215 stores these drawing strokes as an ink object in the storage device 245.

If the user has to erase some of the drawing strokes, in step 520, the user can engage the erase mode on the stylus 255 or the electronic tablet 250. Once the erase mode is activated, the user can hover over the strokes he wishes to erase with the stylus 255 in step 252. The erase mode can also be adjusted such that entire strokes are erased or only portions of strokes immediately engaged by the stylus 255 are erased. If the user disengages the stylus 255 from the electronic tablet 250 after engaging a single stroke, the ink processing module 225 will erase that entire stroke in step 540. Alternatively, if the user decides to drag the stylus 255 across several strokes on the tablet 250, the parse module 210 can engage a split stroke mode in the erasing functions module 240. In the split stroke mode, in step 555, the ink processing module 225 erases only those portions of the strokes directly engaged by the stylus 255 for erasing. In alternative embodiments, the parse module 210 will shade the drawing stroke that the stylus 255 engages. The shading of the drawing stroke allows the user to see exactly which portions of the stroke will be erased before they are actually removed.

Figure 6A:
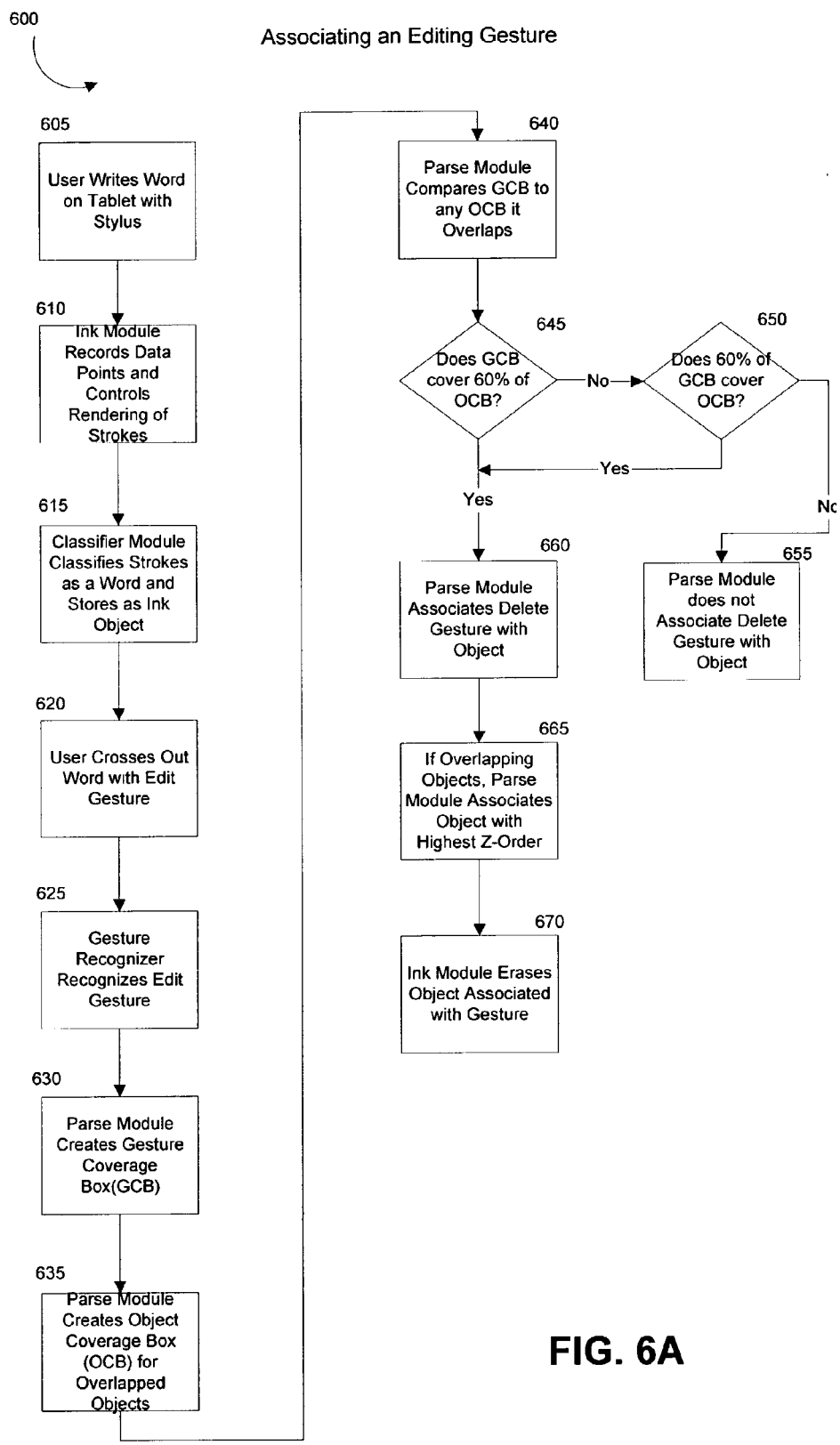
FIG. 6A is a logic flow diagram illustrating a process for recognizing an editing gesture in accordance with an exemplary embodiment of the present invention.
Figure 6B:
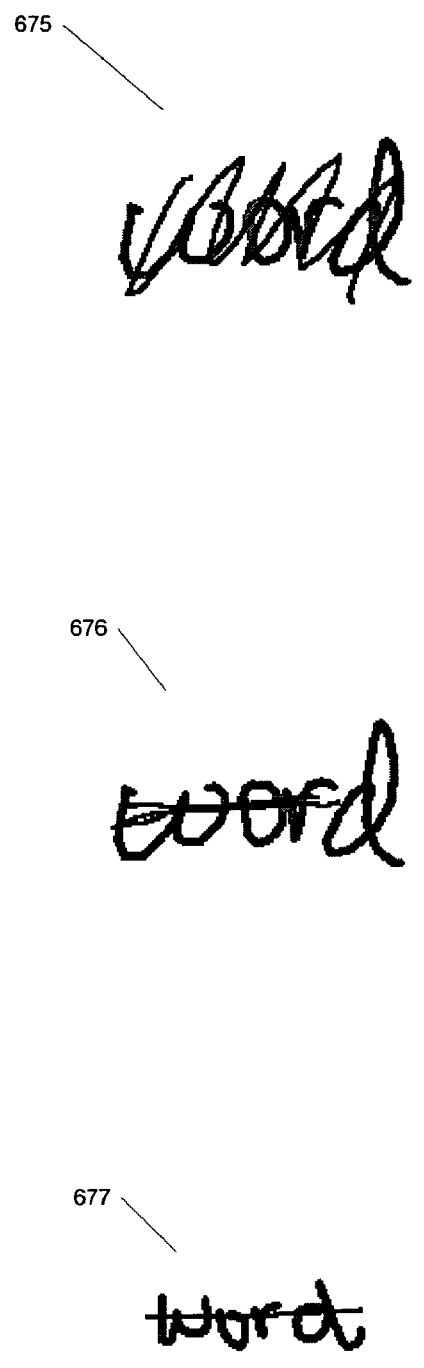

Although the foregoing examples describe various methods for erasing electronic ink, the invention can also be applied to other techniques for editing handwriting rendered on an electronic tablet. For instance, a user may also want to edit a word using a typical strike-through or cross-out gesture. Representative gestures for editing a word that can be recognized by the ink processing module 225 are illustrated in FIG. 6B. An exemplary process 600 for correctly associating an editing gesture with a word is illustrated in FIG. 6A. In step 605, the user writes a word on the electronic tablet 250 using the stylus 255. In step 610, the ink processing module 225 receives data from the electronic tablet 250 and the stylus 255 describing the movements of the stylus 255. The ink processing module 255 uses this data to render electronic ink that represents the handwriting strokes of the user. In step 615, the classifier module 215 will classify the handwriting strokes as a word or a drawing and store them as an ink object.

Figure 6C:
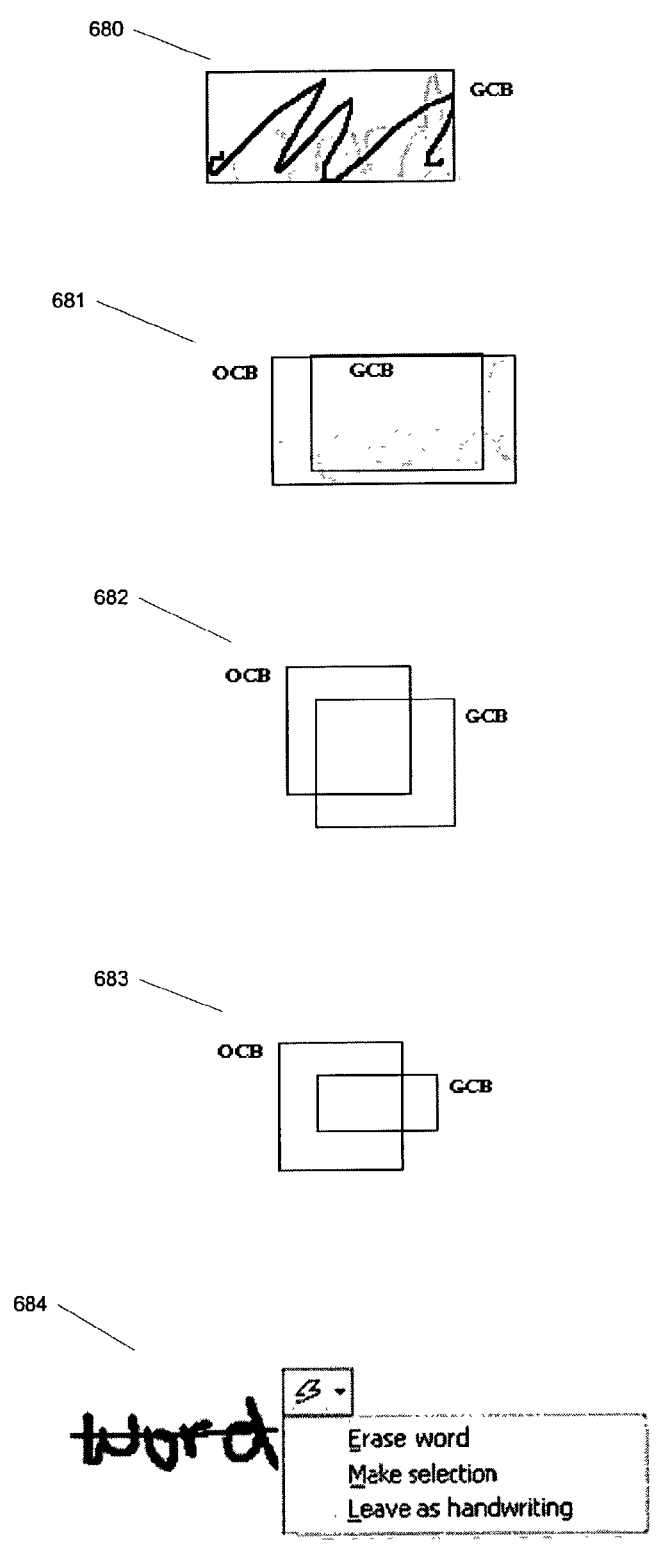
FIG. 6C contains representative displays associated with recognizing an editing gesture in accordance with an exemplary embodiment of the present invention.

If the word needs to be edited, the user may cross-out the word with some type of gesture such as the examples provided in FIG. 6B. The gesture recognizer module 230 recognizes this as a delete gesture in step 625. Associating the gesture with a particular strokes of a word or drawing is the job of the parse module 210. The parse module creates a gesture coverage box (GCB), in step 630, around the gesture made by the user. An exemplary coverage box is illustrated in the representative display 680 in FIG. 6C. In step 635, the parse module 210 creates an object coverage box (OCB) for any objects overlapped by the gesture coverage box. An exemplary object coverage box bounding a word is illustrated in representative display 681.

Because editing gestures may be used imprecisely, the parse module 210 must determine which strokes the user intends to edit with the gesture. Accordingly, in step 640, the parse module 210 compares the overlapping gesture coverage box and object coverage box. In this exemplary embodiment, if sixty percent of the gesture coverage box or the object coverage box is overlapped, then the parse module 210 associates the gesture with the strokes within the object coverage box in step 660. If the coverage between the two bounding boxes does not meet the predetermined threshold, the parse module 210 will not associate the gesture with the object and it will not be erased, as shown in step 655. In some instances there may be overlapping objects with which the edit gestures can be associated. In the preferred embodiment, where there are multiple overlapping objects, the parse module 210 associates the edit gesture with the object with the highest Z-axis order, or the top object, in step 665. In a more complex example, the edit gestures may overlap several different objects, but the objects may not overlap each other. Where the edit gestures overlaps a plurality of objects, the parse module 210 can select the object with the greatest percentage of overlap. Lastly, in step 670, the ink processing module 225 erases the ink object the parse module 210 associates with the edit gesture.

In conclusion, the present invention enhances the functions of a computing device, such as an electronic tablet, that can convert handwriting strokes to electronic ink. The present invention improves a user's ability to edit electronic ink with greater precision and efficiency. Specifically, a parse module associated with a document editing module can assist the user in accurately identifying electronic ink strokes that are to be edited. In one aspect, an association technique correlates an editing gesture with particular handwriting strokes. In another aspect, a feedback mechanism signifies to the user which handwriting strokes are selected for editing before any editing actually takes place.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalents thereof. For instance, the methods for editing described herein can be applied in a variety of computing environments. Furthermore, the system and method described herein can be applied to a variety of electronic documents beyond those created with an electronic tablet and stylus, such as those created with personal computing devices or handheld computers.

What is claimed is:

1. A computer-implemented method for editing electronic ink comprising:
   creating an electronic ink stroke on a computing device with an input device, wherein the electronic ink stroke represents the motion of the input device;
   receiving an indication of an edit mode on the computing device;
   receiving a first input that engages the electronic ink stroke displayed by the computing device;
   displaying a bounding rectangle around the electronic ink stroke, wherein the bounding rectangle encompasses an entirety of the electronic ink stroke;
   dividing the bounding rectangle into a first portion, wherein the first portion corresponds to a core stroke of the electronic ink stroke and a second portion, wherein the second portion corresponds to an end stroke of the electronic ink stroke;
   receiving a second input that further engages the engaged portion comprising one of the following: the first portion of the electronic ink stroke and the second portion of the electronic ink stroke;
   in response to receiving the second input, changing a color of the further engaged portion and removing the bounding rectangle;
   receiving a third input corresponding to the input device disengaging from the engaged portion; and
   in response to receiving the third input, erasing, from a display, at least a part of the further engaged portion.

2. The method of claim 1, further comprising reflowing nearby ink strokes to close a gap created by the erased portion.

3. The method of claim 1, further comprising classifying the electronic ink stroke by associating it with one of a plurality of categories comprising word or drawing.

4. A computer-readable medium having computer-executable instructions for performing the steps recited in claim 1.

5. The method of claim 1, further comprising:
   displaying a visual cue in the vicinity of the layout correction to alert a user that an automated correction has occurred.

6. The method of claim 5, further comprising:
   receiving an input directed at the visual cue; and
   responsive to the input, displaying a plurality of options related to the automated correction.

7. The method of claim 1, further comprising, in response to receiving the third input, invoking a layout correction.

8. The method of claim 1, wherein erasing the at least the part of the further engaged portion comprises erasing all of the further engaged portion.

9. A computer-implemented method for editing electronic ink comprising:
   creating an electronic ink stroke on a computing device in response to an input device, wherein the electronic ink stroke represents the motion of the input device;
   engaging an edit mode on the computing device;
   receiving an engaging input corresponding to the electronic ink stroke displayed by the computing device being engaged by the input device, wherein the computing device operates in the edit mode;
   displaying a bounding rectangle around the electronic ink stroke, wherein the bounding rectangle encompasses an entirety of the electronic ink stroke;
   dividing the bounding rectangle into a first portion, wherein a first portion represents a core stroke and a second portion, wherein a second portion represents an end stroke;
   modifying the electronic ink stroke such that it visibly changes as displayed by the computing device;
   receiving a disengaging input corresponding to the input device being disengaged from the electronic ink stroke displayed on the computer device;
   in response to receiving the disengaging input, removing the bounding rectangle and erasing the modified part of the electronic ink stroke; and
   invoking a layout correction in response to erasing the modified part of the electronic ink stroke.

10. A computer-implemented method for editing electronic ink comprising:
    creating an electronic ink stroke on a computing device in response to an input device, wherein the electronic ink stroke represents the motion of the input device;
    receiving an editing gesture on the computing device from the input device;
    recognizing the editing gesture;
    associating the editing gesture with a part of the electronic ink stroke;
    displaying a bounding rectangle around the electronic ink stroke, wherein the bounding rectangle encompasses an entirety of the electronic ink stroke;

dividing the bounding rectangle into a first portion and a second portion, wherein the second portion encompasses the part of the electronic ink stroke;

in response to receiving an input corresponding to the input device being disengaged from a display device, removing the bounding rectangle and erasing the part of the electronic ink stroke; and invoking a layout correction wherein the location of nearby ink strokes is modified in response to erasing the part of the electronic ink stroke.

11. The method of claim 10, further comprising:

presenting, via the computing device, options for editing the electronic ink stroke associated with the editing gesture.

12. A computer-readable medium having computer-executable instructions for performing the recitations of claim 10.

13. The method of claim 10, further comprising:

displaying a visual cue in the vicinity of the layout correction to alert a user that an automated correction has occurred.

14. The method of claim 13, further comprising:

receiving an input directed at the visual cue; and responsive to the input, displaying a plurality of options related to the automated correction.

15. A computer-implemented system for editing electronic ink comprising:

an electronic tablet device operable for generating stroke input based on the motions of a handheld device, wherein the stroke input represents the motions of the handheld device;

a display device, coupled to the electronic tablet device;

an ink processing module operable for receiving the stroke input and rendering an electronic ink stroke on the display device;

a parsing module coupled to the ink processing module and operable for receiving an edit input from the electronic tablet device and supplying a feedback element to the electronic ink stroke rendered on the display device supplying the feedback element comprises displaying a bounding rectangle around the entirety of the electronic ink stroke, the parsing module further operable for, in response to receiving an input corresponding to the handheld device being disengaged from the display device, removing the bounding rectangle and erasing a portion of the electronic ink stroke rendered on the display device; and a reflow module coupled to the ink processing module and operable for repositioning a plurality of nearby electronic ink strokes in response to the edit input.

16. The system of claim 15, wherein the parsing module is further operable for:

receiving an editing gesture from the electronic tablet device; and associating the editing gesture with the electronic ink stroke.

17. The system of claim 15, wherein the edit input is identified by the ink processing module.

18. The system of claim 15, wherein the feedback element is supplied to only a portion of the electronic ink stroke.

* * * * *